United States Patent
Regev et al.

(10) Patent No.: US 8,522,065 B2
(45) Date of Patent: Aug. 27, 2013

(54) GENERATING A RANDOM NUMBER IN AN EXISTING SYSTEM ON CHIP

(75) Inventors: Guy Regev, Barkan (IL); Yehoshua Mann, Kfar Saba (IL); Avi Daniel, Hertzlia (IL); Rafy Carmon, Rishon le Zion (IL); Ram Sokolov, Even-Yehuda (IL)

(73) Assignee: Percello Ltd. (IL)

( * ) Notice: Subject to any disclaimer, the term of this patent is extended or adjusted under 35 U.S.C. 154(b) by 408 days.

(21) Appl. No.: 12/876,304

(22) Filed: Sep. 7, 2010

(65) Prior Publication Data

US 2011/0060935 A1 Mar. 10, 2011

Related U.S. Application Data

(60) Provisional application No. 61/240,211, filed on Sep. 6, 2009.

(51) Int. Cl.
*G06F 1/00* (2006.01)
*G06F 7/58* (2006.01)

(52) U.S. Cl.
USPC .............. 713/500; 708/250; 708/255

(58) Field of Classification Search
USPC ........................................ 713/500
See application file for complete search history.

(56) References Cited

U.S. PATENT DOCUMENTS

| | | | | |
|---|---|---|---|---|
| 6,862,605 | B2 * | 3/2005 | Wilber | 708/255 |
| 7,047,262 | B2 * | 5/2006 | Hars | 708/255 |
| 7,124,155 | B2 * | 10/2006 | Hars | 708/250 |
| 7,496,617 | B2 * | 2/2009 | Franke et al. | 708/255 |
| 7,702,704 | B2 * | 4/2010 | Muranaka | 708/250 |
| 8,260,835 | B2 * | 9/2012 | Fukushima et al. | 708/251 |
| 8,307,022 | B2 * | 11/2012 | Matsumoto et al. | 708/255 |
| 2007/0150531 | A1 * | 6/2007 | Jeon | 708/250 |
| 2008/0263362 | A1 * | 10/2008 | Chen | 713/184 |

* cited by examiner

*Primary Examiner* — Suresh Suryawanshi
(74) *Attorney, Agent, or Firm* — Sterne, Kessler, Goldstein & Fox PLLC (57) ABSTRACT

A system for generating a true random number and implemented within an existing System on Chip (SoC) is provided herein. The system includes one or more sub circuitry synchronous modules configured to operate in a specified nominal clock rate, wherein each sub circuitry synchronous modules yields expected deterministic results when operating in its nominal clock rate; and a control module configured to clock the one or more sub circuitry synchronous modules each in a clock rate higher than its respective the nominal clock rate and beyond a specified value, to yield a non deterministic behavior of the one or more sub circuitry synchronous modules, resulting in one or more random signals, wherein the system is implemented within an existing system on chip (SOC).

11 Claims, 5 Drawing Sheets

Figure 1
(EXISTING ART)

Figure 2
(EXISTING ART)

GENERATING A RANDOM NUMBER IN AN EXISTING SYSTEM ON CHIP

CROSS-REFERENCE TO RELATED APPLICATION

This application claims priority to U.S. Provisional Patent Application Ser. No. 61/240,211, filed Sep. 6, 2009, which is incorporated by reference in its entirety, as if fully set forth herein.

BACKGROUND

1. Technical Field

The present invention relates to the field of generation of random numbers, and more particularly, to generation of true random numbers.

2. Discussion of the Related Art

The methods of generating random numbers can grossly be divided into two main categories: Pseudo random number generating and true random number generating. The first method produce numbers which statistically behave as random numbers but are completely deterministic, unless the pseudo number engine is being seeded by a true random number engine. The latter method, in most cases relies on physically random process as the source of entropy, like physically random noises in any electrical circuit (e.g., shot noise and thermal noise).

In various technical fields, there is a need to generate true random numbers, enhancing an existing system's hardware to generate such number without changing or adding hardware to the system, and generating such numbers inside (completely internal) an Integrated Circuit (IC), for example inside a silicon chip without dependencies on controlled external conditions. This is needed in order to prevent external security attacks.

The need to generate a true random number (or encryption key) is rising with the security needs current electronic systems are required to support. Many of the security algorithms require starting from a true random number or key which will change every time the electronic system is turned on, and between different systems of the same type. A pseudo-random number is not sufficient for this purpose since upon given initial conditions (seed) the pseudo-random number generator will generate the exact same sequence of numbers every time. Since this need can be a new requirement from an existing product that was not designed to support this requirement, the product provider is facing the problem of manufacturing a new IC, which is very costly, which now contain a dedicated random number generator circuit in order to meet the new requirement.

Several methods of generating a true random numbers are known in the art. One such example is the ring oscillator. The ring oscillator is a chain of inverters which generates an internal clock. Since the process varies this clock will have a different frequency between chips. The design then uses this clock to feed a counter which counts a certain amount of constant time which is large enough to generate differences in counting that are caused by process variation, voltage and temperature and on-die-variation. The counter value is then being read as the random number. This value will vary from chip to chip.

Figure 1:
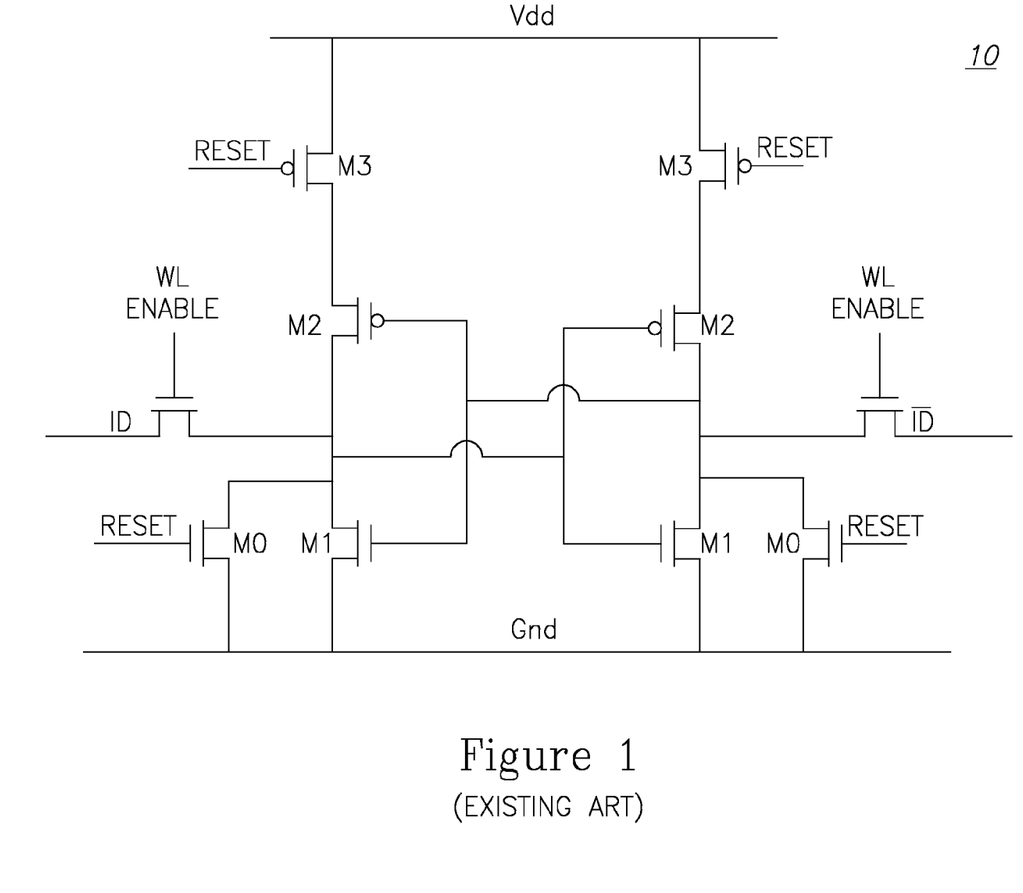
FIG. 1 illustrates a system for generating a random number using an n-bit Latch register, according to the existing art.

FIG. 1 illustrates a dedicated circuit using an n-bit Latch register 10, according to the existing art. The n-bit register 10 is made of Latches which are not circuit biased, in other words, their n-type section and p-type section are more or less the of same resistance and have more or less the same conductance (mobility of electrons and holes are more or less the same). Due to the intentional de-biasing the Latches, quasi-static state is achieved in the latch bit cell and the n-bit register in power up will stabilize on a random value. Another method of generating this random number based on quasi-static (meta-stability) is by using a cross-coupled NOR cells.

Figure 2:
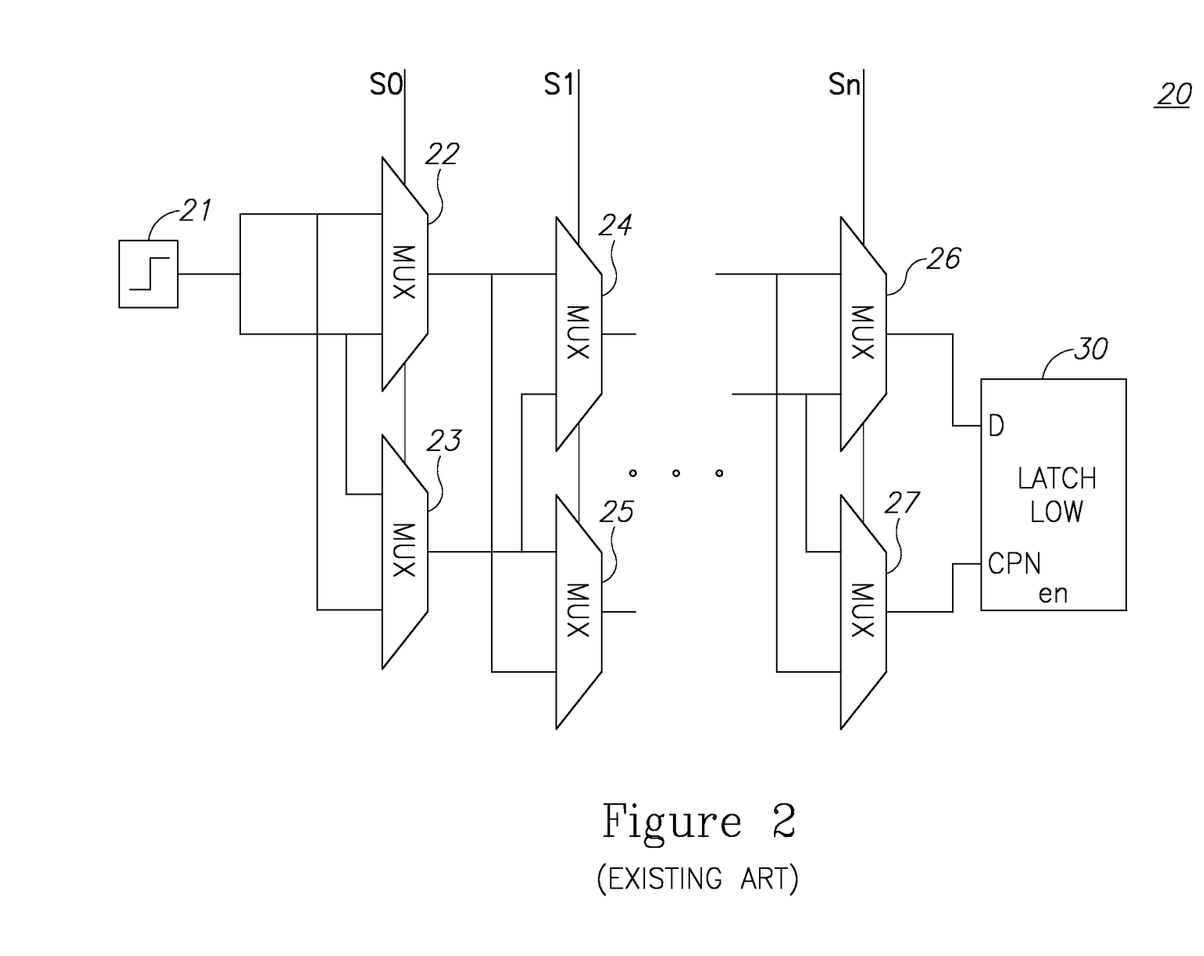
FIG. 2 illustrates a system for generating a random number using mux trees, according to existing art.

FIG. 2 illustrates yet another exemplary circuit 20 using mux trees made of mux units 22-27, according to the existing art. Using two mux trees in which depending on the select signal will go through a crossed path or a straight one and propagate the signal from the source such as a clock 21. This tree should be designed and laid out across the chip (die) to take into account also the on-die process variation. The latch 30 will output 1 if top path is faster, else 0.

BRIEF SUMMARY

In embodiments, there is provided a method to generate a true random number on an System-On-Chip IC which was not initially designed to generate a random number, i.e., which does not contain a dedicated circuit which can generate a random number. Since manufacturing of a new IC can be expensive the system and method may present a way to generate a random number by unconventional means in order to use the already existing IC.

According to one aspect of the invention, there is provided a system for generating true random numbers and implemented within an existing System on Chip (SoC). The system includes one or more sub circuitry synchronous modules configured to operate in a specified nominal clock rate, wherein each sub circuitry synchronous modules yields expected deterministic results when operating in its nominal clock rate; and a control module configured to clock the one or more sub circuitry synchronous modules each in a clock rate higher than its respective the nominal clock rate and beyond a specified value, to yield a non deterministic behavior of the one or more sub circuitry synchronous modules, resulting in one or more random signals, wherein the system is implemented within an existing system on chip (SOC).

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

In the accompanying drawings.

The drawings together with the following detailed description make apparent to those skilled in the art how the invention may be embodied in practice.

DETAILED DESCRIPTION

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 3:
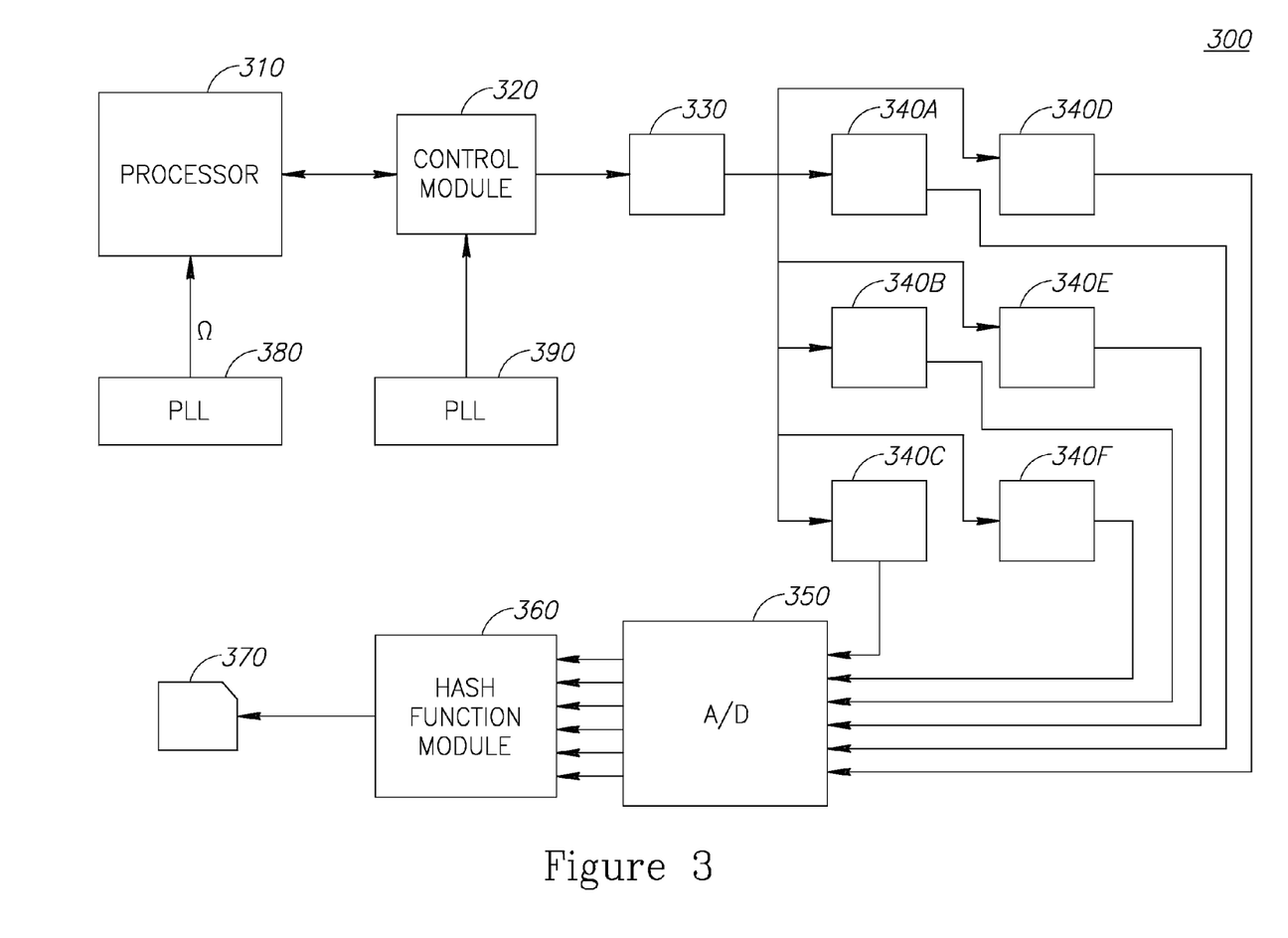
FIG. 3 shows a block diagram of the system according to some embodiments of the invention.

FIG. 3 is a block diagram showing a system for generating true random. System 300 is implemented or "retrofitted" into an existing System on Chip (SoC) that contains, among other nodules, a processor 310 and a phase lock loop (PLL) 380 arranged to clock it in its nominal clock rate, Additionally, system 300 includes one or more sub circuitry synchronous modules 340A-340F configured to operate in a specified nominal clock rate, wherein each sub circuitry synchronous modules yields expected deterministic results when operating in its nominal clock rate. System 300 further includes a control module 320 configured to clock the one or more sub circuitry synchronous modules 340A-340F, using Phase Lock Loop (PLL) 390 each in a clock rate higher than its respective the nominal clock rate and beyond a specified value, to yield a non deterministic behavior of the one or more sub circuitry synchronous modules, resulting in one or more random signals, wherein the system is implemented within an existing system on chip (SoC).

Consistent with some embodiments of the invention, system 300 further includes an analog to digital (A/D) converter 350 configured to convert the one or more random signals into a set of random numbers.

Consistent with some embodiments of the invention, system 300 further includes a hash function module 360, arranged to apply a hash function to the set of random numbers to yield a single random number 370 that has a level of randomness beyond a specified level.

While pseudo random numbers are related to the randomness in a current as it begins to flow through a conductor, true random numbers are related to the randomness of voltage or voltage variation which occurs when a conductor is in equilibrium. In order to capitalize on these noises in order to create a random number a way is needed to extract its randomness and measure it. Embodiments of the present invention make use the phase lock loop (PLL) 390 whose jitter is sensitive to these noises, on top of that the system and method may use Shadow Random Access Memory (SRAM) cells as sub circuitry modules 340A-340F associated with a meta-stability which is also a good detector of these noises. Embodiments of the invention propose a method to generate this number inside an existing IC which does not contain dedicated circuits to solve this problem and thus saving the product provider money and resources of designing and manufacturing a new IC.

Consistent with some embodiments of the invention there is a major difference from all existing solutions in the fact that it comprises a way to use an existing SoC circuit which does not contain any dedicated circuits for the purpose of generating a true random number, and use it in an innovative way such to create a true random number. For that, common resources which exist in most SoC chips are exploited, such as: process variation, on die variation, on chip processor (or DSP), and two or more PLLs, and SRAM cells. The proposed solution uses a combination of all or some (not limited to all for the case that some SoC might not contain all listed resources) in order to produce a truly random number which can later be used for key generation or seeding.

In order to present the idea methodically first each of the common resources the system and method may use in order to generate a true random number is presented, and innovative ways to combine them to achieve even better entropy for generating the random numbers are presented.

Consistent with some embodiments of the invention, using process variation, a silicon chip (SoC) can be easily used to create randomness. This is due to the natural process variations in manufacturing of ICs. It is true that ICs manufacturing is digitally stable, i.e. the sequential digital circuits inside will work within the process variation bounds and correct timing closure insures that timing will be met within the bounds. If the sequential circuit frequency is out of the bounds meta-stability on Flip-Flops or Latches can occur and produce random results. Inside the bounds, parameters like resistance, mobility, and physical characteristics such as oxide thickness and n-well/p-well doping that would cause the n transistor Vth and P transistor Vth to change will behave with the same probability density function as the process variation. This in turn will directly affect electrical path delays which will behave randomly as well i.e. the same electrical path will be of different delays between different chips. For example in an exemplary TSMC 130 nm process the standard deviation of Vth (Vthreshold) across corners of the process can be up to 8% and the standard deviation of oxide thickness across process corners can be up to 10%. All these variation cause chips to behave differently in terms of path delays and power. The majority of the dedicated true random number generator circuits capitalize on the delay variation that the process variation naturally creates. Since process variation exists in all manufactured chips the system and method may use it for true random number generation.

Consistent with some embodiments of the invention on die variation may also be used. This variation is very similar to the process variation in characteristics but lower in variance. Basically on die variation is an occurrence of a process variation on a smaller scale such as delays can vary across the die due to process variation across the die. Also noises will differ across the die, for example, one side of the die can be of different temperature than a different side. These factors affect the delay of cells (transistors) in a random way adding more randomness or entropy to the desired numbers.

Consistent with some embodiments of the invention, the on chip processor 310 may be utilized in the architecture that provides a way for a SoC (System On a Chip) to generate a true random number. Almost every SoC includes a processor (which usually runs at faster frequencies than the rest of the hardware) and periphery hardware blocks (can be hardware accelerators) which the processor controls, activates and gathers results from. Usually peripherals run at lower frequencies than the processor. The processor is also the master of the PLLs of the chip. The PLL being an analog circuit, a phase lock loop which is used to generate an accurate fast clock from a lower frequency input clock. The processor will be used to activate the hardware blocks in such a way that will generate a random number in the periphery hardware blocks. The processor will then access its periphery blocks and read all the values generated by the hardware blocks during the generation process, concatenate them to a fingerprint which can be composed of thousands of bits and then use universal hashing to extract 128 (or other size) random bits from the N bits of fingerprint and increase the entropy of the random number.

As explained above, system 300 may require two or more PLLs in the SoC. One PLL 380 for the processor 310 which would run at its nominal frequency and will control the random number generation process. The other PLL 390 would be controlled by the processor 310 (e.g., via control module 320) and will be used in such a way to generate a random number. The extra one or more PLLs will be used to supply the periphery blocks with a much higher frequency then nominal frequency the periphery circuit was designed to work at. As an example, it may be assumed without limiting the general case that a periphery block contains a 32 bit counter which is supposed to work at 100 Mhz, i.e., timing was closed for 100 MHz in the worst case corner. The system and method may do timing analysis on this circuit block in order to establish what is the maximum performance this circuit can function at, this will be in the fast corner process with the highest voltage and lowest temperature (for 65 nmlp at TSMC it is fast-corner at 1.32V and −40 C). The system and method may run this counter at this frequency and after some time stop it and let the processor read its value. Since the circuit was not designed to meet such high frequency, it will cause the counter to behave thus, some of the bits in a certain cycle will become meta-stable and some not. On another cycle it can change and other bits will sample a stable value and others will sample a changing value which will cause meta-stability. The system and method may do several iterations of counting with the same counter and use all the counters available for us in different periphery blocks (this will also factor in on-die variation).

Figure 4A:
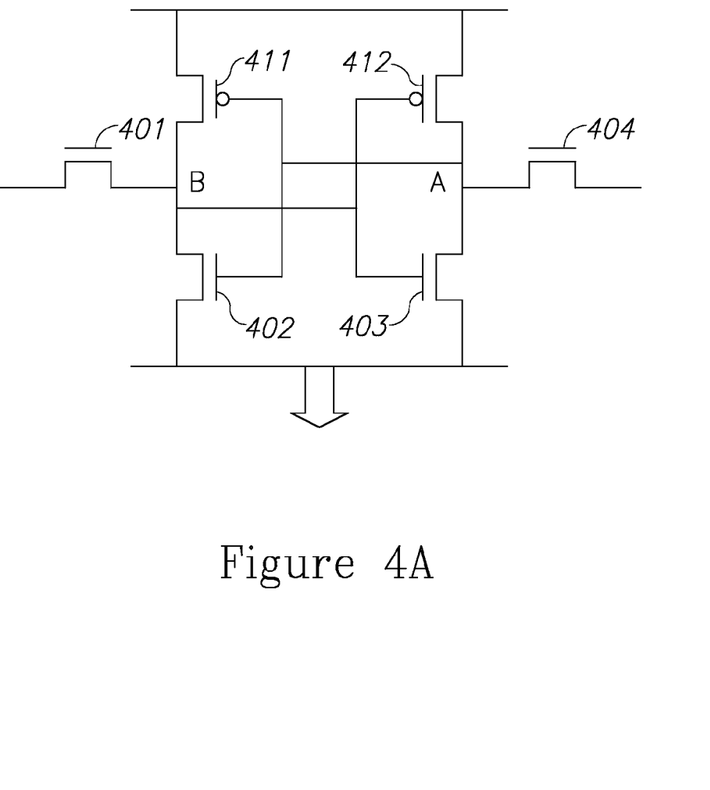
FIGS. 4A and 4B is a schematic illustration of SRAM cells, according to some embodiments of the invention.

FIG. 4A is a schematic illustration of SRAM cells, according to some embodiments of the invention. A SRAM bit-cell usually consists of 6 transistor cells, four of which compose two tightly cross-coupled inverters 411, 402 and 412, 403 and the other two 401 and 404 are access transistor switches as shown in the left figure below. The right figure shows a zoom-up of a p-transistor and its major parameters. The Vth (Vthreshold) and Leff are random parameters that vary with the process variance (between different chips) and with the on-die process variance on the same die or chip (in different place in the chip). The noise is completely random and will change its value as a function of time.

Figure 4B:
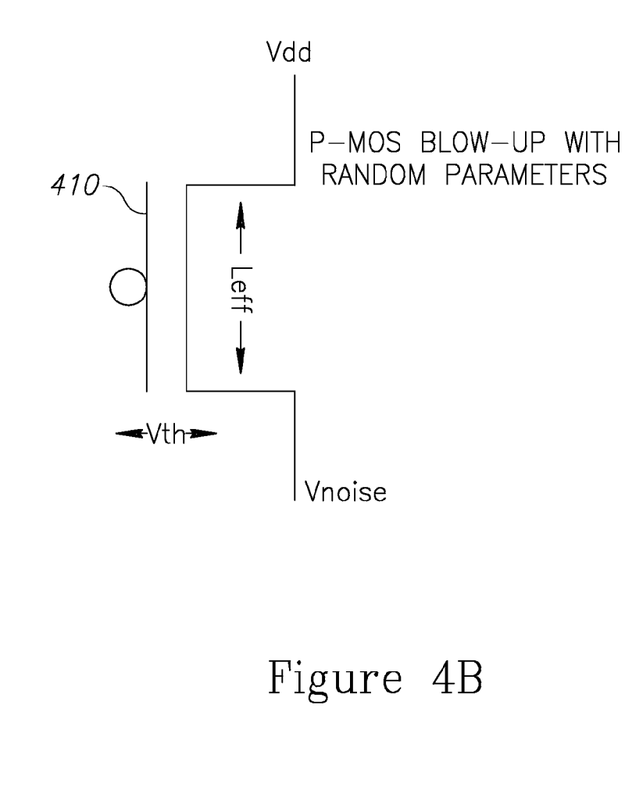

FIG. 4B shows one of the transistors 411 in greater detail in operation. Before power up AB=00. After powering up the cell will stabilize either on logic 1 (AB=01) or logic 0 (AB=10). On bit-cell in which the Vth of the p-channel and re-channel are close in value, the noise will determine the stable state to which the temporary quasi-static state will incline. This will differ in value between power-ups. On the other hand, on bit-cells in which the thresholds are skewed significantly (process variation) the bit-cell will always stabilize either on 0 or 1 and will be immune to noise. This value will of course differ from chip to chip due to process variation but will stay constant with different power-ups of the same chip. The system and method may use both random functions (process variation and random noise) to create the true random number.

Figure 5:
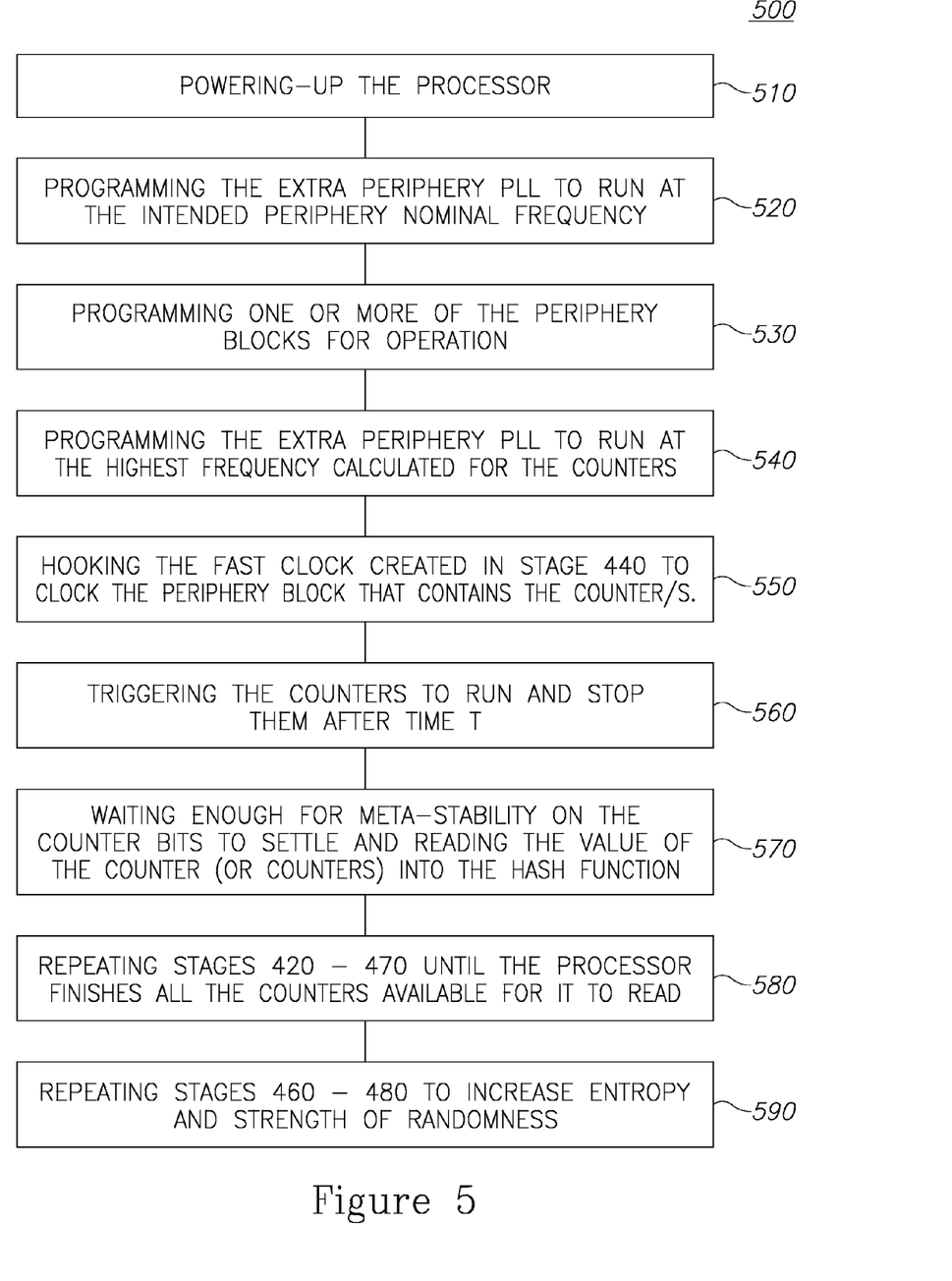
FIG. 5 is a high level schematic flowchart illustrating a method of generating a random number in an existing SOC IC, according to some embodiments of the invention.

FIG. 5 is a high level schematic flowchart illustrating method of generating a random number in an existing SOC IC, according to some embodiments of the invention. Following are the stages: Powering-up the processor (stage 510); Processor programming the extra periphery PLL to run at the intended periphery nominal frequency (stage 520); Processor programming one or more of the periphery blocks for operation (stage 530), i.e. so the counters the system and method may need to use will be ready to run. (Again, counter is a simple example but it can be any machine that the block contains which its results can later be read from the processor); Processor programming the extra periphery PLL to run at the highest frequency calculated for the counters (or set of counters) (stage 540); Processor hooking the fast clock created in stage 540 to clock the periphery block that contains the counter/s (stage 550); Processor triggering the counters to run and stop them after time T (stage 560); Processor waiting enough for meta-stability on the counter bits to settle and reading the value of the counter (or counters) into the hash function (stage 570); Processor repeating stages 520-570 until it finished all the counters available for him to read (each counter can have different maximum frequency); and Processor repeating stages 560-580 to increase entropy and strength of randomness. As shown above, the output of the hash function is the true random number.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A system comprising:
   one or more sub circuitry synchronous modules, each of the one or more sub circuitry synchronous modules being configured to operate in a respective nominal clock rate, wherein each of the one or more sub circuitry synchronous modules yields expected deterministic results when operating in its respective nominal clock rate; and
   a control module configured to clock the one or more sub circuitry synchronous modules each in a clock rate higher than its respective nominal clock rate and beyond a specified value, to yield a non deterministic behavior of the one or more sub circuitry synchronous modules, resulting in one or more random signals, wherein the system is implemented within an existing system on chip (SOC).

2. The system according to claim 1, wherein at least one of the one or more sub circuitry synchronous modules is associated with a process invariance, wherein the non deterministic behavior is due to the process invariance.

3. The system according to claim 1, further comprising an analog to digital converter configured to convert the one or more random signals into a set of random numbers.

4. The system according to claim 3, further comprising a hash function module configured to apply a hash function to the set of random numbers to yield a single random number that has a level of randomness beyond a specified level.

5. The system according to claim 1, further comprising at least one processor and two or more phase lock loops (PLL) modules, wherein at least one of the PLL modules is configured to clock the at least one processor at a respective nominal clock rate, and wherein at least one of the PLL modules are configured to clock the one or more sub circuitry synchronous modules at the higher clock rate beyond the specified value.

6. The system according to claim 1, wherein the one or more sub circuitry synchronous modules are memory cells.

7. The system according to claim 1, wherein the one or more sub circuitry synchronous modules are SRAM cells.

8. A method of generating a true random number utilizing a system on chip (SOC), the method comprising:
   providing a SOC having a plurality of sub circuitry synchronous modules, each of the plurality of sub circuitry synchronous modules being configured to operate in a respective nominal clock rate, wherein each of, the plurality of sub circuitry synchronous modules exhibit process invariance and yield expected deterministic results while operating in the nominal clock rate;
   clocking one or more sub circuitry synchronous modules in a clock rate substantially higher than its respective nominal clock rate to yield a non deterministic behavior of the at least one sub circuitry synchronous module, due to process variance, resulting in at least one random number; and
   applying a hash function on the at least one random number thereby generating a number exhibiting a high level of randomness.

9. The method according to claim 8, further comprising;
   providing at least one processor and two or more phase lock loops (PLL) modules;
   clocking the at least one processor at a respective nominal clock rate; and
   clocking the one or more sub circuitry synchronous modules at the higher clock rate beyond a specified threshold, wherein the clocking is carried out by the PLL modules respectively.

10. The method according to claim 8, wherein the one or more sub circuitry synchronous modules are memory cells.

11. The method according to claim 8, wherein the one or more sub circuitry synchronous modules are SRAM cells.

* * * * *

UNITED STATES PATENT AND TRADEMARK OFFICE
CERTIFICATE OF CORRECTION

| | |
|---|---|
| PATENT NO. | : 8,522,065 B2 |
| APPLICATION NO. | : 12/876304 |
| DATED | : August 27, 2013 |
| INVENTOR(S) | : Regev et al. |

Page 1 of 1

It is certified that error appears in the above-identified patent and that said Letters Patent is hereby corrected as shown below:

Claims

Col. 8, line 43, claim 9, "comprising;" should read --comprising:--.

Signed and Sealed this
First Day of July, 2014

Michelle K. Lee
*Deputy Director of the United States Patent and Trademark Office*